United States Patent [19]

Reppert et al.

[11] Patent Number: 5,390,393
[45] Date of Patent: Feb. 21, 1995

[54] CASTER WITH A FOULING-RESISTANT BEARING CUP FEATURE

[75] Inventors: David A. Reppert, Brodheadsville, Pa.; James A. Kinion, Fostoria, Ohio

[73] Assignee: Metro Industries, Inc., Reno, Nev.

[21] Appl. No.: 8,554

[22] Filed: Jan. 22, 1993

[51] Int. Cl.6 .................................. B60B 33/00
[52] U.S. Cl. ............................. 16/21; 16/35 R; 16/31 A; 16/37
[58] Field of Search .......... 16/18 CG, 18 R, 20–22, 16/35 R, 48, 31 A, 31 R, 43, 44, 37, 38

[56] References Cited

U.S. PATENT DOCUMENTS

| | | | |
|---|---|---|---|
| D. 308,934 | 7/1990 | Howell et al. | D8/375 |
| D. 319,384 | 8/1991 | Lange | D8/375 |
| D. 329,011 | 9/1992 | Block | D8/375 |
| 860,650 | 7/1907 | Fletcher | 16/23 |
| 1,395,484 | 11/1921 | Diss . | |
| 1,486,217 | 3/1924 | Baum | 16/23 |
| 1,861,539 | 6/1932 | Lilly . | |
| 1,896,978 | 2/1933 | Hele-Shaw et al. | 16/21 |
| 2,905,964 | 9/1959 | Hull | 16/20 |
| 3,691,590 | 9/1972 | Drabert | 16/18 |
| 3,964,124 | 6/1976 | Crawford | 16/21 |
| 4,037,292 | 7/1977 | Lapham | 16/38 |
| 4,054,964 | 10/1977 | Kaneko | 16/20 |
| 4,554,704 | 11/1985 | Raffaeli | 16/21 |
| 4,620,342 | 11/1986 | Haussels | 16/18 R |
| 4,658,466 | 4/1987 | Vollberg et al. | 16/35 R |
| 4,805,259 | 2/1989 | Kassai | 16/35 R |
| 4,815,161 | 3/1989 | Timmer et al. | 16/35 R |
| 4,835,815 | 6/1989 | Mellwig et al. | 16/35 R |
| 4,941,552 | 7/1990 | Screen | 188/1.12 |
| 4,985,960 | 1/1991 | Zun | 16/35 R |
| 5,214,823 | 6/1993 | Screen | 16/35 R |
| 5,244,062 | 9/1993 | Felton | 16/35 R |

FOREIGN PATENT DOCUMENTS

| | | |
|---|---|---|
| 56181 | 5/1939 | Denmark . |
| 0486850A1 | 5/1992 | European Pat. Off. . |
| 40144 | 6/1968 | Finland ................ 16/37 |
| 2800095 | 7/1979 | Germany ............. 16/21 |
| 2833330A1 | 2/1980 | Germany . |
| 2943697 | 5/1981 | Germany ............. 16/20 |
| 3513068 | 10/1986 | Germany ........... 16/31 R |
| 63-301101 | 8/1988 | Japan . |
| 7390 | of 1893 | United Kingdom .... 16/21 |
| 1002833 | 9/1965 | United Kingdom .... 16/37 |
| 1150617 | 4/1969 | United Kingdom .. 16/31 R |

OTHER PUBLICATIONS

*Wheels and Castors*, Dieter Weckerle, verlag moderne industrie, Albert Schulte Sohne, pp. 46–49, 1992.
Patent Abstracts of Japan, vol. 13, No. 133 (M–809), Apr. 4, 1989.

*Primary Examiner*—Lowell A. Larson
*Assistant Examiner*—Donald M. Gurley
*Attorney, Agent, or Firm*—Fitzpatrick, Cella, Harper & Scinto

[57] ABSTRACT

A caster includes a U-shaped caster horn having a top web portion and two contiguous downwardly-extending leg portions to define a unitary, U-shaped member providing a wheel accommodating space. A wheel is rotatably supported in the space such that the caster horn partially covers the wheel, The caster horn features a fouling-resistant bearing cup integrally formed thereon for receiving and retaining a bearing assembly, which secures one end of an structure-supporting stem. A swivel cap with a hole formed in the center thereof is placed over the cup while allowing an opposite end of the stem to protrude therethrough. A brake mechanism supported by the caster horn may be operated to inhibit or prevent rotation of the wheel.

19 Claims, 5 Drawing Sheets

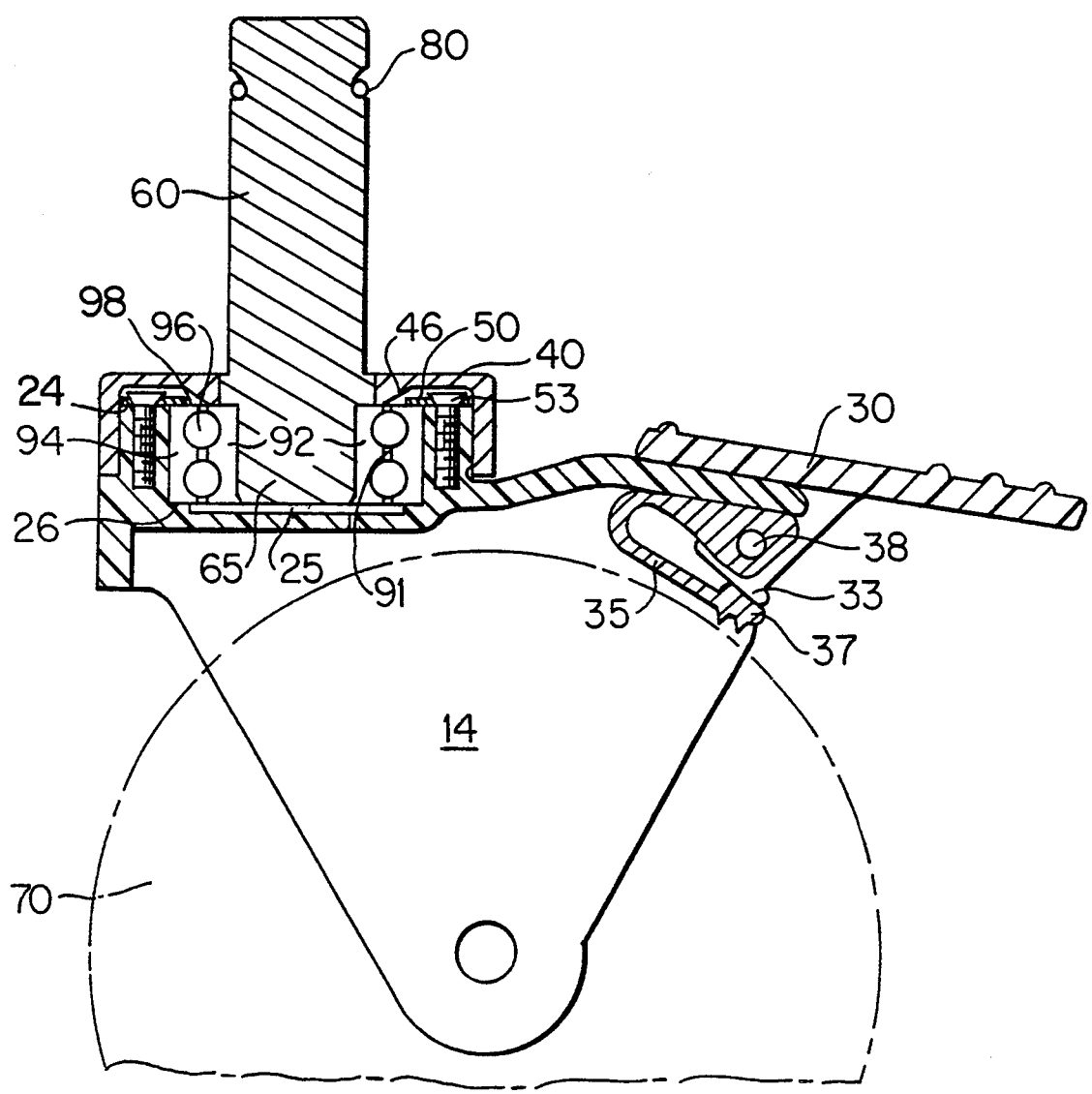
FIG. 7
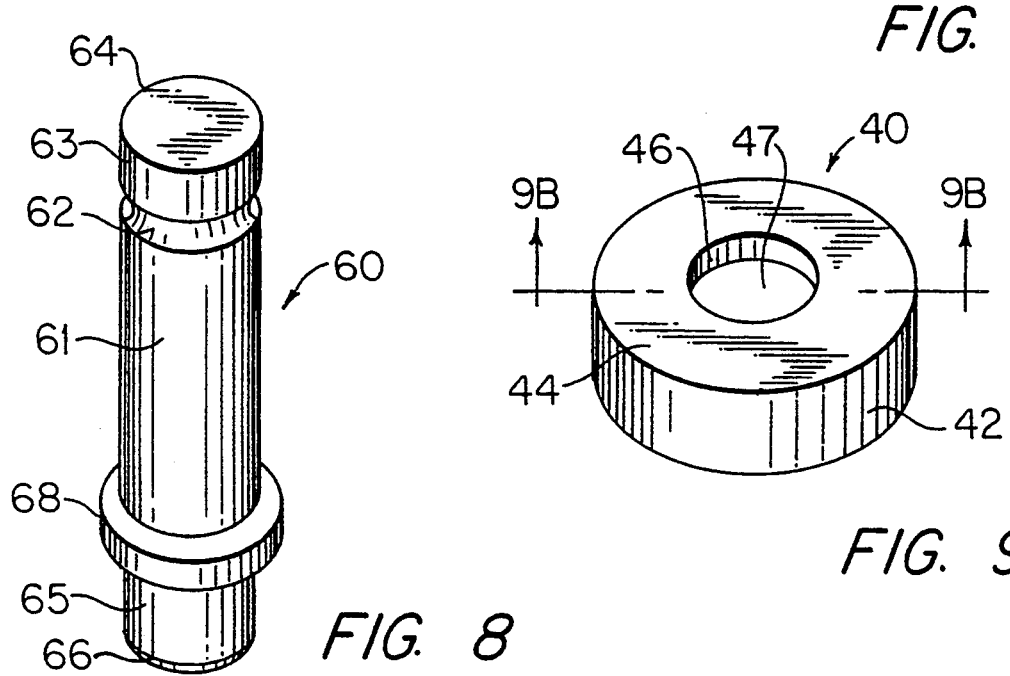
FIG. 8
FIG. 9A

CASTER WITH A FOULING-RESISTANT BEARING CUP FEATURE

BACKGROUND OF THE INVENTION

1. Field of the Invention

The present invention relates to a caster. More specifically, the present invention relates to a swivel caster assembly having an integrally-formed bearing cup for retaining a bearing assembly, wherein the likelihood of contamination of the bearing assembly by a foreign substance is greatly reduced.

2. Description of the Prior Art

Casters are utilized in a wide variety of applications, such as providing mobility for a supported structure including pallets, carriages, bins, chests, carts, trolleys, furniture, scaffolding, and the like. In use, casters are generally characterized as being either furniture, apparatus, transportation equipment, or heavy duty casters.

A caster is either of a rigid type, i.e. non-swiveling, or a swiveling type. In the rigid type, the caster wheel is free to rotate about a horizontal axis but is otherwise fixed with respect to the supported structure. This arrangement allows for translational movement of the caster with respect to a supporting surface on which the caster moves. In the swiveling type, the caster wheel also is free to rotate about a substantially vertical axis relative to the place where it is secured to the supported structure. This allows both translational and rotational movement of the caster with respect to the supporting surface on which the caster moves. Typically, in a swiveling-type caster, the wheel is offset from tile vertical axis so as to trail the vertical axis during movement of the supported structure. The present invention pertains to an improvement in a swiveling-type caster.

In certain instances, casters are provided with a motion-restricting, locking device to inhibit and/or prevent swiveling of the caster per se to effect a directional locking feature and/or to prohibit rotation of the caster wheel to effect a braking action.

Factors affecting the design of a caster include operating environment, ease of maintenance, loading, rolling characteristics, maneuverability, and locking features. These factors lead inter alia to caster geometry and size, selection of component materials and surface treatment, size and disposition of the bearing assembly, and the method by which the caster is secured to the supported structure.

U.S. Pat. No. 1,395,484 (Diss) discloses a simple, conventional, top-bearing caster which is generally open and therefore subject to fouling or contamination by a foreign substance.

U.S. Pat. No. 1,861,539 (Lilly) discloses a swivel caster which is designed to reduce the likelihood of jamming of the caster wheel as a result of contamination or fouling by a foreign substance. Although the featured caster provides some protection against contamination, the bearing assembly is not protected.

U.S. Pat. No. 3,964,124 (Crawford) discloses a sealed caster wherein the relatively movable parts, such as the swivel bearing, are sealed by a resilient synthetic material to prevent entry of foreign matter into the bearing. Although the sealed caster provides some protection for the swivel bearing, it is still vulnerable to corrosion because the seal is not watertight.

U.S. Pat. No. 4,554,704 (Raffaeli) discloses a corrosion-resistant caster, designed for use in a corrosive environment, utilizing caster parts having a permanently-bonded, high-lubricity fluorocarbon polymer coating. Although such casters are useful for some applications, the use of coated moving parts is generally not well-suited for casters intended for heavy load applications.

U.S. Pat. No. 4,835,815 (Mellwig, et al.) discloses a caster including a blocking device in the form of a pivoting brake member which restricts movement of the caster wheel relative to the caster frame and movement of the frame relative to its support.

Other conventional casters are disclosed in U.S. Pat. No. 3,691,590 (Draberr), U.S. Pat. No. 4,620,342 (Haussels), and U.S. Pat. No. 4,805,259 (Kassai). U.S. Pat. No. 4,815,161 (Timmer, et al.), U.S. Pat. No. 4,941,552 (Screen), and U.S. Pat. No. 4,985,960 (Zun, et al.).

In addition, caster designs are shown in U.S. Pat. No. 308,934 (Howell, et al.), U.S. Pat. No. 329,011 (Block), and U.S. Pat. No. 319,384 (Lang).

A useful source of technical information pertaining to caster technology is *Wheels and Casters* by Verlag Moderne Industrie AG & Co. with the collaboration of Albert Schulte Söhue GmbH & Co. (1992).

Although prior art casters may be well-suited for many varied applications, there is need for an aesthetic, durable caster with a protected bearing assembly that is resistant to fouling due to contamination by a foreign substance, which is capable of being very easily fabricated and maintained, and which lends itself to a broad variety of applications, particularly in the food-service, lodging, and health-care industries where maintaining cleanliness of the caster and supported structure by washing with water and/or a disinfectant solution must be performed on a regular basis.

SUMMARY OF THE INVENTION

It is an object of the present invention to improve upon the casters known in the prior art.

It is another object of the present invention to provide a relatively inexpensive, durable, simply-fabricated, swiveling-type caster that is aesthetically pleasing, reliable, corrosion resistant, and readily cleanable, being especially suitable for use in the food-service, lodging, and health-care industries where cleanliness must be maintained.

To achieve the foregoing objects, the invention in one aspect pertains to a caster comprising a unitary U-shaped caster horn including a web portion and a pair of downwardly-extending, opposed leg portions; a bearing cup formed integrally on a top surface of the caster horn, the bearing cup being defined by an annular wall portion and a closed bottom portion, the wall portion and the bottom portion being continuous with each other; a bearing disposed in the bearing cup, such that a top surface of the bearing is substantially flush with a top surface of the wall portion of the bearing cup, a stem having one end fitted into the bearing and being rotatably supported by the bearing; and a wheel rotatably supported between the leg portions such that the caster horn partially surrounds the wheel.

The invention in another aspect pertains to a caster horn comprising a web portion formed between two opposed leg portions, the web portion and the leg portions defining a U-shaped unitary member providing a wheel-accommodating space therebetween; and a seamless bearing cup formed on a surface of the web portion opposite from the wheel-accommodating space, the bearing cup comprising a closed bottom portion.

The invention in a further aspect pertains to a method of manufacturing a caster comprising the steps of forming a unitary caster horn having a web portion with a bearing cup and a pair of opposed leg portions, the web portion and the leg portions defining a U-shaped, member providing a wheel-accommodating space, therebetween, wherein a bearing cup is disposed on a surface of the web portion opposite from the wheel-accommodating space; setting a bearing assembly in the bearing cup; securing the bearing to the bearing cup by means of a retainer and fasteners, wherein the fasteners engage the caster horn; pressing a first end of a stem into the bearing such that the stem is vertically rotatable with respect to the caster horn; covering the bearing cup while allowing access to a second end of the stem; and rotatably supporting a wheel within the wheel-accommodating space.

The invention in a yet another aspect pertains to a method of manufacturing a caster comprising the steps of forming a caster horn having a web portion with a bearing cup and a pair of downwardly-extending, opposed leg-portions, the web portion and the leg portion defining a U-shaped unitary member providing a wheel-accommodating space, therebetween wherein the bearing cup is disposed on a surface of the web portion opposite from the wheel-accommodating space; thermoplastically setting a bearing assembly in the bearing cup; mechanically securing the bearing to the bearing cup by means of a retainer and a plurality of fasteners, wherein the fasteners engage the caster horn; pressing a first end of a stem into the bearing such that the stem is vertically rotatable with respect to the caster horn, an end covering the bearing cup while allowing access to a second end of the stem; and rotatably supporting a wheel within the wheel-accommodating space.

The invention in yet a further aspect pertains to a method of manufacturing a caster horn, comprising the steps of forming web portion between two opposed leg portions, wherein an inner surface of the web portion and the leg portions define a U-shaped unitary member providing a wheel-accommodating space; therebetween and forming a seamless bearing cup on a surface of the web portion opposite from the wheel-accommodating space, the bearing cup comprising a closed bottom portion.

A more complete appreciation, along with an understanding of other aspects, objects, features, and advantages of the present invention, will become apparent from the following detailed description when taken in conjunction with the accompanying drawings.

BRIEF DESCRIPTION OF THE DRAWINGS

FIG. 7 is a cross-sectional view of the caster taken along plane 7—7 shown in FIG. 5.

FIG. 8 is an isometric view of a stem comprising a component of the caster shown in FIG. 3.

FIG. 9A is an isometric view of a swivel cap comprising a component of the caster shown in FIG. 3.

DETAILED DESCRIPTION OF THE PREFERRED EMBODIMENTS

Initially, an overview of the basic caster components will be provided.

Figure 1:
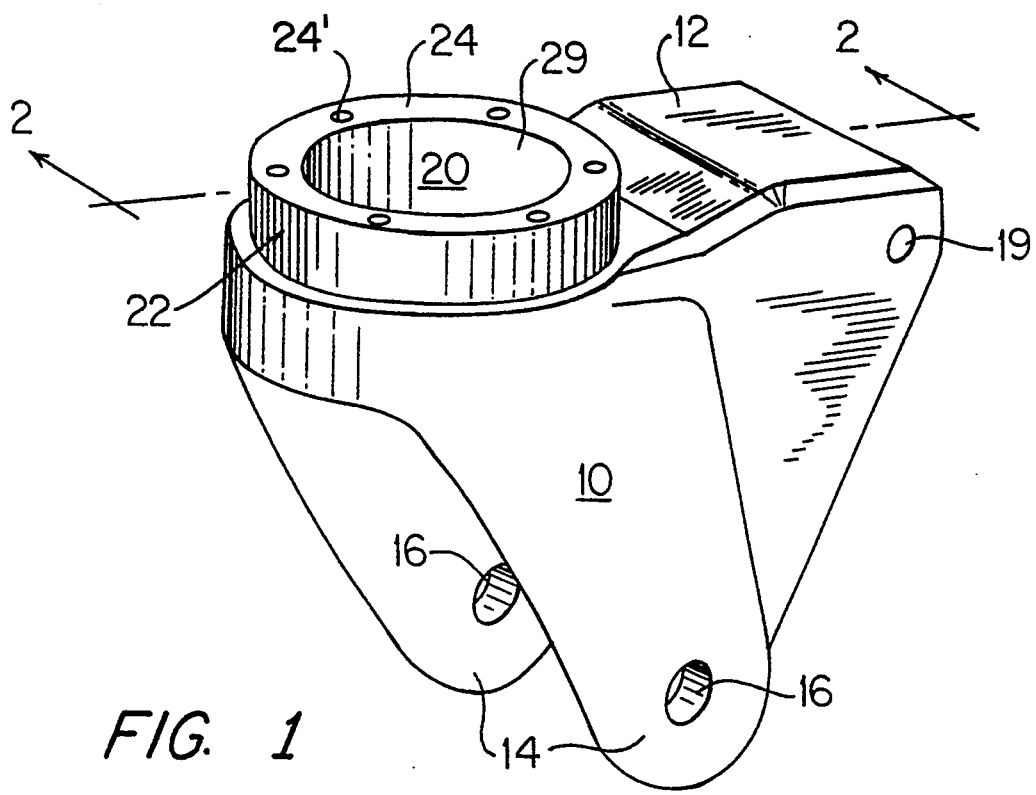
FIG. 1 is a three-quarter front, isometric view of a caster horn constituting a main component of a caster according to a preferred embodiment of the present invention.
Figure 3:
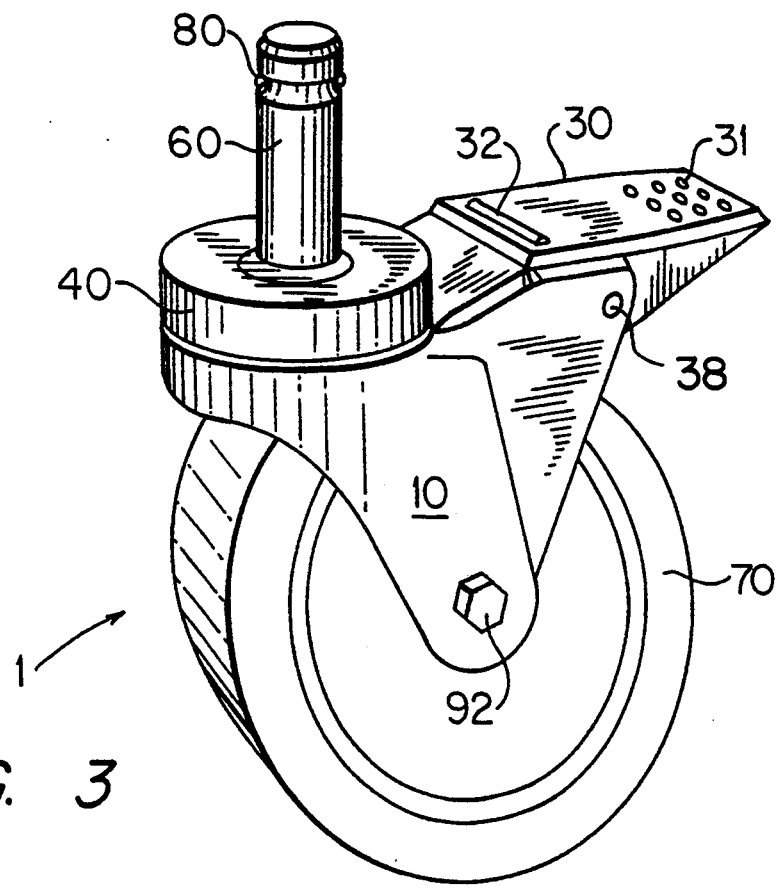
FIG. 3 is a three-quarter front, isometric view of a caster according to a preferred embodiment of the present invention.

First with reference to FIGS. 1 and 3, a caster 1 according to a first embodiment of the present invention comprises, as a main component thereof, an inverted, U-shaped, caster horn or yoke 10. Caster horn 10 includes an intermediate web portion 12 formed between two downwardly-extending leg portions 14. The leg portions 14 each include a through hole 16 formed to receive an axle bolt for supporting a wheel. A fouling-resistant bearing cup 20 is integrally formed on the top surface of the web portion 12. Bearing cup 20 comprises an annular wall portion 22 including a top surface 24 in which a plurality of boreholes 28 are formed.

Figure 2:
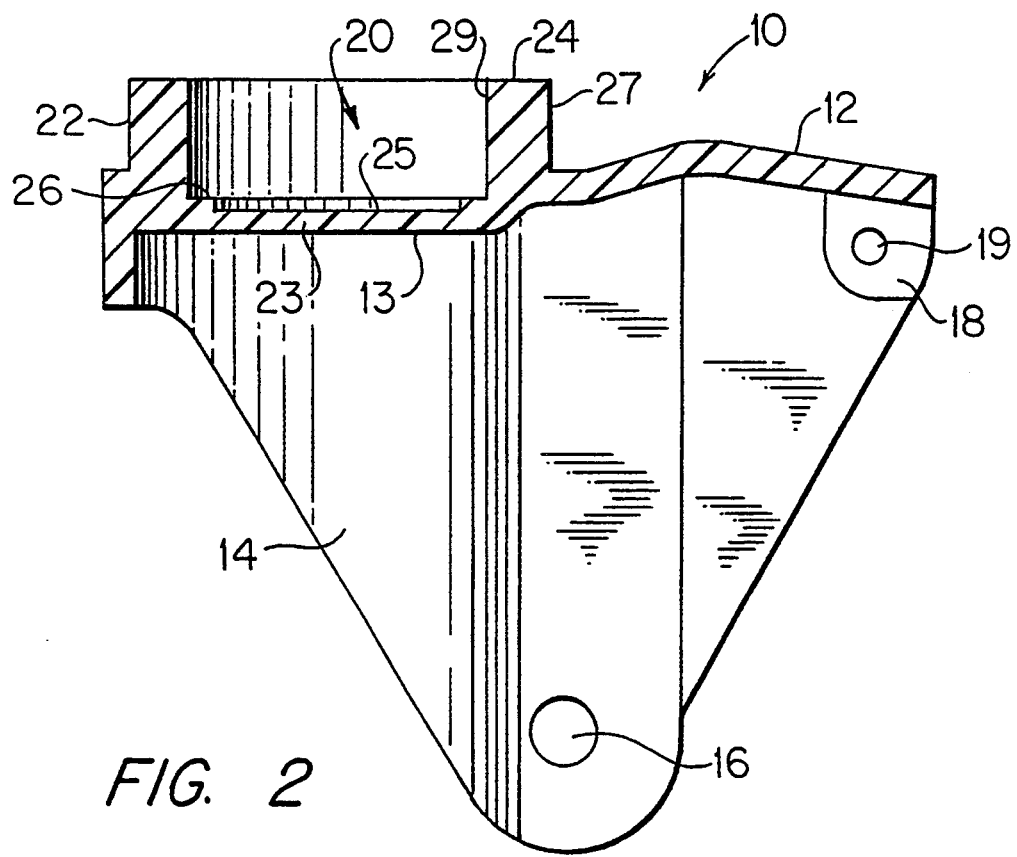
FIG. 2 is a cross-sectional view of the caster horn shown in FIG. 1, taken along plane 2—2 shown in FIG. 1.

As can be seen in FIG. 2, through holes 16 are offset relative to the center of bearing cup 20, which also will be the center of an upstanding bearing stem 60 (as shown in FIGS. 3 through 8). One end of stem 60 is secured to the supported structure to be supported by caster 1. The offset relationship causes a caster wheel 70 to operate in a trailing fashion when the caster 1 and supported structure are moved on its supporting surface (see FIGS. 3, 4, 6 and 7).

Caster horn 10 may be thermoplastically formed from a polyamide material, such as NSC TM ESBRIDE TM, which is a ceramic and glass fiber reinforced nylon material made by the Thermofil, Inc., AMODEL ® made by Amoco, or any other suitable material. The finish of caster horn 10 should be free of all scratches, burrs, flashing, and crazing to effect a pleasing appearance.

FIG. 2 illustrates caster horn 10 in cross-section and shows the configuration of the bearing cup 20 which includes the wall portion 22 and a continuous, closed base portion 23 formed on a surface of web portion 12. Accordingly, there is no communication between the underside portion 13 of web 12 with the inside of bearing cup 20.

The base portion 23 of bearing cup 20 includes a recessed area 25. Accordingly, the inside perimeter 26 of the bearing cup immediately adjacent to wall portion 24 is raised relative to the recessed area 25. The outside surface 27 of the wall portion 22 has a smooth finish for reasons which will be discussed below.

Caster horn 10 further includes an integrally-formed, downwardly-extending boss 18 on an inside surface of each end of web portion 12 opposite from the end where bearing cup 20 is located. Each boss 18 has a through hole 19 located therein for receiving a pin, or the like, about which a brake mechanism is rotatably supported on caster horn 10. The axle bolt 90, wheel, pin, and brake mechanism will be discussed in detail below.

FIG. 3 is an isometric view of the caster 1 comprising caster horn 10 and other components forming the assembled structure. Caster horn 10 is free to rotate vertically with respect to stem 60.

A circular swivel cap 40 is removably secured over bearing cup 20 and allows an end of stem 60 to protrude through a hole formed in the center of the bearing cup. An opposite end of stem 60 is pressed into the center of a bearing assembly, which is thermoplastically set in and then mechanically secured to bearing cup 20, as will be discussed below.

Wheel 70 is rotatably, horizontally supported by means of an axle bolt 90 secured in through holes 16 formed in the leg portions 14 of caster horn 10. Details of the axle bolt 90 and the through holes 16 will also be discussed below.

The braking mechanism, which inhibits and/or prevents rotation of the wheel 70, includes brake lever 30, which pivotably cooperates with an elastically deformable brake member 35, shown in FIG. 7, so as to rotate about pin 38 which is secured in caster horn 10.

Brake lever 30 may be operated by the hand or foot of the user of the structure supported by caster 1. A textured surface in the form of raised semi-spherical projections, one of which is shown by reference numeral 31 and a raised elongated strip 32, which is semicircular in cross-section, are provided on the top surface of brake lever 30. The textured surface provides tactile feedback for a better "feel" resulting in a more secure operation of brake lever 30. Moreover, the textured surface gives brake lever 30 an aesthetic finished appearance.

A stem-retaining ring 80 is provided to removably secure stem 60 in the supported structure as will be discussed hereinbelow.

Figure 4:
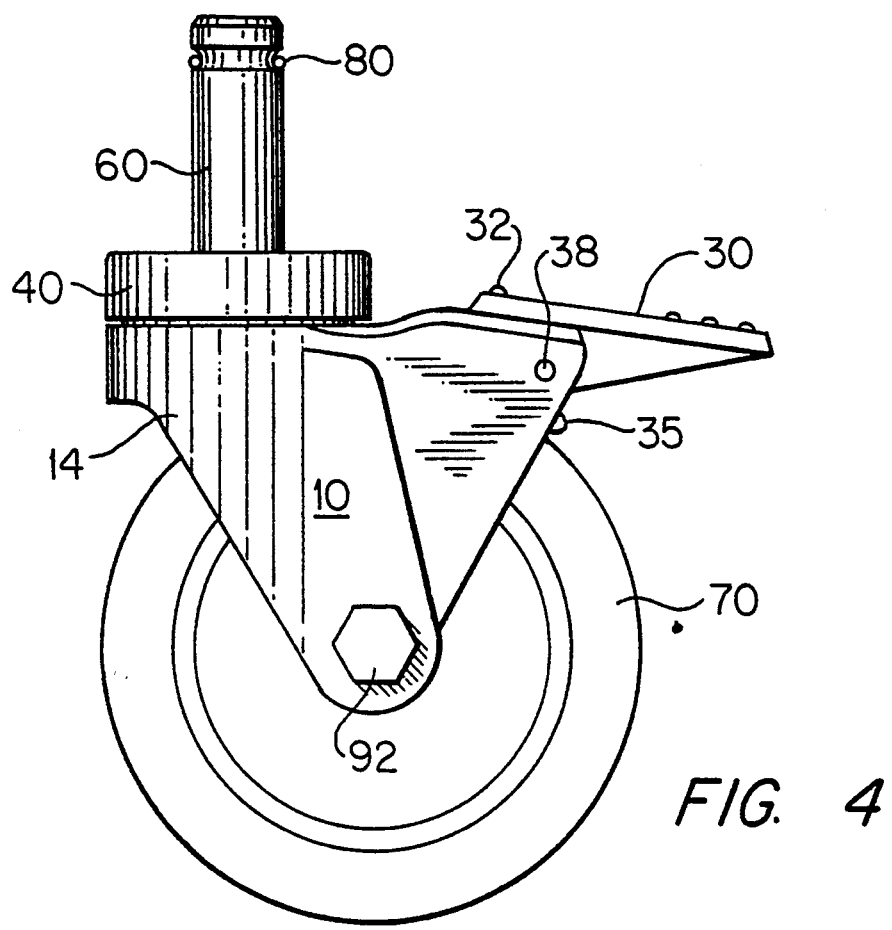
FIG. 4 is a left-side, elevational view of the caster shown in FIG. 3.
Figure 6:
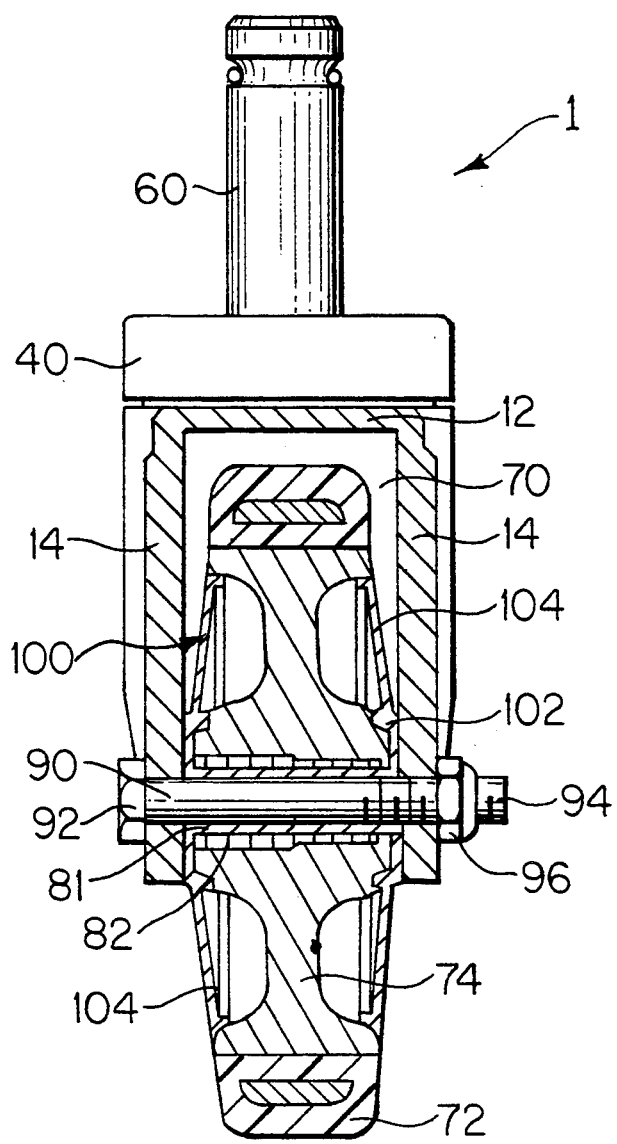
FIG. 6 is a cross-sectional view of the caster taken along plane 6—6 in FIG. 5.

Now the specific structures of the caster in accordance with the present invention will be discussed in greater detail. Referring to FIGS. 4 and 6, caster horn 10 constitutes a V-shaped, forked structure defining a unitary frame member, partially overlying wheel 70, to provide a wheel-accommodating space. Wheel 70 is rotatably supported within the space by an axle bolt, depicted in FIG. 6 by reference numeral 90, having a cap head 92 at one end and a threaded nut, depicted in FIG. 6 by reference numeral 96, at the other end. Axle bolt 90 is inserted in through hole 16 formed in each leg portion 14 and extends horizontally from one leg portion 14 to the other.

A top corner of caster horn 10 rotatably supports the braking mechanism including brake lever 30 and a elastically-deformable brake member 35, shown in greater detail in FIG. 7, which cooperates to rotate about pin 38. Brake lever 30 is rotatably supported between the two end portions of the top corner of horn 10. Bosses 18, shown in FIG. 2, formed inside the horn 10 ensure sufficient clearance for brake lever 30 to move freely.

Figure 5:
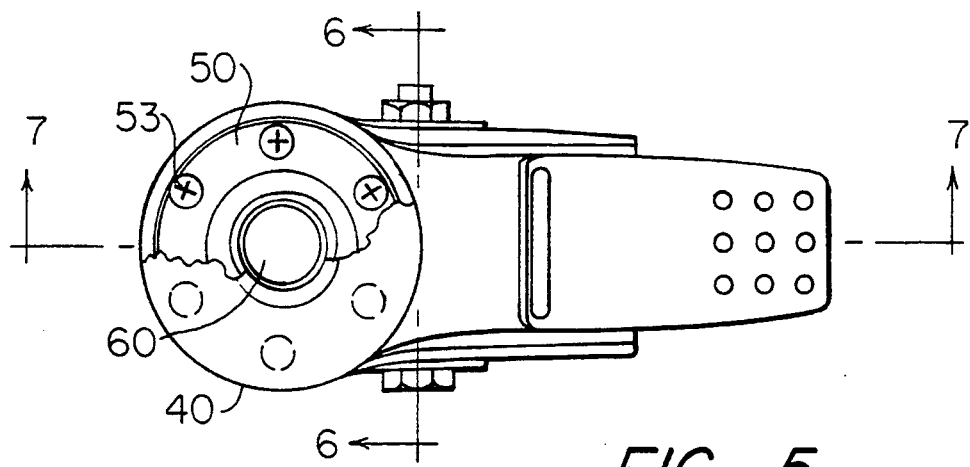
FIG. 5 is a partially broken-away, top plan view of the caster shown in FIG. 3.

FIG. 5 is a top plan view of caster 1 with a portion of swivel cap 40 broken away to reveal a portion of a bearing retainer 50 securing a bearing assembly (not shown) in bearing cup 20. As noted above, swivel cap 40 has a central opening allowing a portion of stem 60 to extend therethrough for engagement with the supported structure. Once in position, the swivel cap 40 effectively seals the bearing cup 20.

Bearing retainer 50 is mechanically secured over the bearing assembly to caster horn 10 by means of a plurality of self-tapping, Phillips-head machine screws, one of which is shown by reference numeral 53. Screws 53 threadably engage a like number of boreholes 28 formed in the top surface 24 of annular wall 22 which defines the perimeter of bearing cup 20.

Axle bolt (depicted in FIG. 6 by reference numeral 90) is inserted in through hole 16 in each leg portion 14 of caster horn 10 and through an axle hole in the caster wheel 70. Axle bolt 90 is urged through wheel 70 until its threaded end portion 94 emerges from through hole 16 in the opposing leg portion 14 and bolt head 92 abuts an outside surface of the first leg portion. A suitably-sized threaded nut 96 is secured to the threaded end portion 94 to retain the axle bolt 90 in position thereby securing wheel 70 to caster horn 10.

FIG. 6 illustrates, in detail, the structure of wheel 70 and its spatial relationship with respect to caster horn 10. Specifically, wheel 70 includes a tire 72 secured in a well-known manner to a hub 74. Typically, hub 74 is fabricated from a corrosion-resistant material, such as stainless steel, aluminum, or the like. Alternatively, a high-impact plastic may be used for hub 74 if the anticipated load supported by caster 1 is light. Tire 72 may be made of a material most suitable for its intended use. Such materials include nylon, polypropylene, rubber, and polyurethane. Tire 72 may be formed so as to be solid, semi-pneumatic, or pneumatic depending on the degree of shock absorption desired, taking into consideration the material of the tire, and the nature of the supporting surface on which the caster 1 will move in normal use. For example, a solid tire formed from a hard material is more suitable for handling heavier loads but provides less shock absorption than a pneumatic tire formed from a soft material. If there is the possibility that tire 72 may come in contact with petrochemicals, a chemical-resistant material such as nylon or polypropylene may be preferred.

As previously noted, an axle hole is provided in hub 74 of wheel 70. The axle hole is sized to concentrically receive, in order, an axle spacer 81 and an axle bearing 82. Although axle bearing 82 is shown as a plain sleeve bearing, a roller bearing or ball bearing assembly also may be used. A plain sleeve bearing is suitable if the caster will not be subject to much movement. Sleeve bearings are advantageous because they are essentially maintenance-free and corrosion-resistant. Roller bearings and ball bearings are advantageous because they offer little resistance even under heavy loading. Axle spacer 81 may be fabricated from 16 gauge stainless steel and axle bearing 82 may be fabricated from acetal.

A thread guard 100 is provided on each side of wheel 70. Thread guard 100 includes a hub portion 102 with an integrally-formed, peripheral hub cap portion 104. Thread guard 100 is formed to engage the axial spacer 81 so as to remain stationary while the wheel 70 rotates. A hole in the center of the hub portion 102 is positioned over the axle hole formed in the hub 74 of wheel 70 to allow axle bolt 90 to pass through from one leg portion 14 of the caster horn 10 to the other leg portion 14. Thread guard 100 ensures that thread and dirt are not wound onto axle Dolt 90. Hub cap portion 104 is essentially cosmetic and may be omitted. Thread guard 100 typically may be fabricated from steel or plastic and is appropriately finished to achieve a pleasing appearance.

In accordance with an important feature of the present invention and as can be readily seen in FIG. 6, the interior surface of caster horn 10 which defines the wheel-accommodating space, is continuous, i.e. there are no holes, gaps, or spaces between the web portion 12 and the leg portions 14. Moreover, the underside surface 13 of web portion is not compromised by the stem 60. Accordingly, foreign substances, which may be propelled from the surface of wheel 70 by centrifugal force during rotation, have no opportunity to enter the bearing cup 20. This arrangement avoids disadvantages associated with conventional casters of the type wherein an end of the caster seem penetrates the caster horn thereby providing access through which a foreign substance may enter tile bearing chamber and corrode the bearing assembly.

FIG. 7 illustrates the operational relationships of the several components comprising caster 1.

Bearing assembly 91, inserted in bearing cup 20, comprises an inner race 92 and outer race 94 which together confine a vertically-stacked, double row of ball bearings, one of which is shown by reference numeral 96.

In accordance with one aspect of the present invention, the bearing assembly 91 may be thermoplastically set in bearing cup 20 during the fabrication of caster horn 10. That is immediately or shortly after formation of the horn, for example, by injection molding, and before the horn material has cured or stabilized, the outer race 94 of the bearing is seated in the bearing cup. Thereafter, as the horn material cures or stabilizes it will shrink about the outer race to tightly hold the bearing in the cup with a strong friction fit. The outer surface of the outer race can be knurled to enhance this interfit between the outer race and bearing cup. Alternatively, the bearing assembly may be press-fitted into bearing cup 20. The entire outside lower perimeter of outside race 94 is supported by the elevated perimeter portion 26 formed in the bottom of bearing cup 20 in both assembly techniques described above.

A base section 65 of stem 60 is press-fitted into the central opening inside inner race 92 until collar 68 of stem 60 abuts the top surface of inner race 92. Base portion 65 of stem 60 is sized such that when the stem is properly fitted into the bearing assembly 91, the bottom surface of the stem will be essentially even with the bottom surface of the bearing assembly. The bottom of the stem can also be flared to ensure secure mounting of it in the inner bearing race.

Once the stem 60 is assembled in the bearing assembly 91, it will rotate in unison with the inner race 92.

The assembly of the stem and bearing may occur before or after the bearing is mounted in the bearing cup of the horn.

The elevated inside perimeter portion 26 provided in bearing cup 20 supports the outside race 94 of the bearing assembly 90. A top surface 98 of the bearing assembly 91 is substantially flush or co-planar with a top surface 24 of annular wall 22. The recessed area 25 of the base portion 23 of the bearing cup 20 provides clearance for the inner race 92 of the bearing assembly 91 and base section 65 of stem 60.

As noted, a bearing retainer 50 is positioned over bearing assembly 91 and secured in place by a plurality of machine screws one of which is illustrated by reference numeral 53. Bearing retainer 50 is sized such that it overlies the top surface of outer race 94 and such that it does not contact inner race 92. Once the bearing assembly 91 is secured, outer race 94 will rotate in unison with caster horn 10.

If, however, the friction interfit of the bearing cup and bearing is sufficiently strong for the desired application of the caster, the bearing retainer structure can be omitted. Swivel cap 40 is placed over bearing cup 20 and covers bearing assembly 91. Swivel 40 cap is pressed down over bearing cup 20 to form a friction fit between an inner surface of the annular wall of the cap and the outer annular surface of the cup. Accordingly, bearing cap 40 will rotate in unison with stem 60 and inner race 92. The outside surface 27 of bearing cup 20 is finished to be smooth to allow swivel cap 40 to move without unnecessary friction.

Brake lever 30 pivotably cooperates with brake member 35 as can be seen in FIG. 7. When downward force is applied to the free end of brake lever 30, a camming portion 33 of the brake lever 30 will engage the back surface of a brake pad portion 37 integrally-formed on an end of brake member 35. Consequently, camming portion 33 will contact and cause brake pad portion 37 to engage tire 72 (not shown in FIG. 7) mounted on wheel 70. Camming portion 33 and brake member 35 are suitably sized and spaced relative to wheel 70, such that the brake mechanism will releasably lock against the wheel to inhibit and/or prevent the rotation thereof.

FIG. 8 illustrates a generally cylindrical stem 60, which includes a grooved section 62 formed intermediate a smooth center section 61 and a smooth top section 63. A collar 68 is formed intermediate center section 61 and a base section 65. Top section 63 and base section 65 have chamfered terminal edge portions, 64 and 66, respectively, to facilitate assembly. Stem 60 typically may be fabricated from cold rolled steel and is zinc plated.

As illustrated, stem 60 is substantially in the form of a peg. Casters with stems are used in cooperation with a supported structure having boreholes formed therein for receiving the casters. Typically, a sheet steel or plastic socket is pressed or screwed into each borehole. The caster stem is then inserted into the socket where it is retained.

In order to better secure stem 60 in its socket, a C-shaped stem-retaining ring 80 is snapped into place in groove 62. Stem-retaining ring 80 is compressed by the socket and exerts a force radially against the inside of the socket thereby securing caster 1 to the supported structure. Stem-retaining ring 80 may be made of oil-tempered steel wire.

Alternatively, stem 60 may be threaded to engage a threaded bore formed in the supported structure. Further, the threaded stem may be attached by a pair of threaded nuts which may be secured on either side of a plate formed or secured to the supported structure. Yet further, stem 60 may be welded, or otherwise secured, to a plate which in turn is attached to the supported structure by fasteners, such as screws or bolts, according to well-known methods.

Figure 9B:
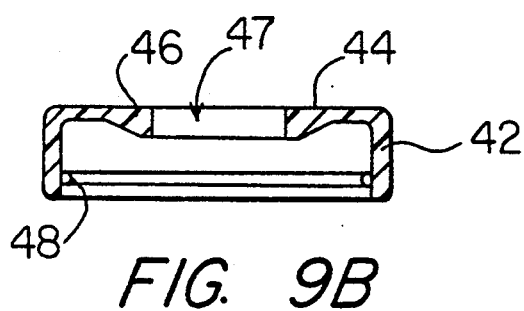
FIG. 9B is a cross-sectional view of the swivel cap, taken along plane 9B—9B shown in FIG. 9A.
Figure 9C:
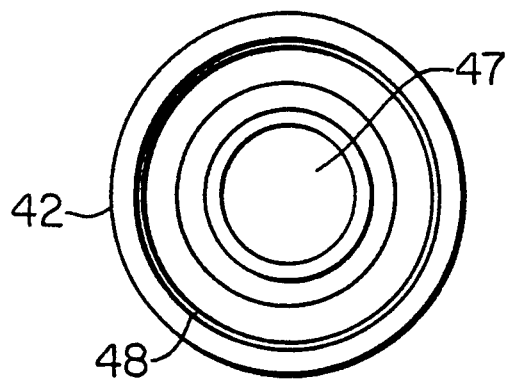
FIG. 9C is a bottom plan view of the swivel cap shown in FIGS. 9A and 9B.

FIGS. 9A, 9B, and 9C illustrate swivel cap 40 in more detail.

Swivel cap includes a side wall portion 42, a top cover portion 44, and a hub portion 46 surrounding a circular opening 47 which is sized to be slightly smaller, e.g. 0.985", than the diameter of collar 68 formed on stem 60, e.g. 1.00". This size relationship between the opening 47 and stem 60 ensures a snug fit between bearing cap 40 and collar 68 of stem 60 which inhibits foreign substances from descending into bearing cup 20.

An inwardly projecting rib 48 extends around the inside perimeter of side wall 42 of bearing cap 40. Rib 48 abuts the outside perimeter 27 of wall portion 22 of the bearing cup 20. When stem 60 rotates relative to caster horn 10, swivel cap 40 rotates with stem 60. Rib 48 glides smoothly against the smooth outside surface of the collar perimeter. Swivel cap 40 may be fabricated from a PVC compound.

Figure 10:
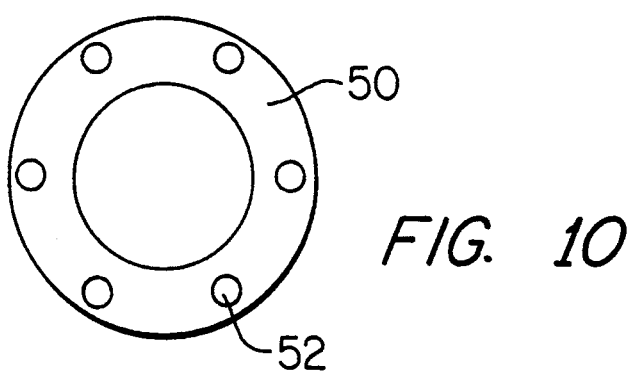
FIG. 10 is a top plan view of a bearing retainer comprising a component of the caster shown in FIG. 3.

FIG. 10 illustrates the bearing retainer 50 in more detail. Bearing retainer 50 is fabricated in a form like a flat washer. A plurality of evenly-spaced through holes, one of which is shown by reference numeral 52, are provided to receive screws 53 for securing the bearing assembly 91 to caster horn 10. The through holes are spaced closer to an outer perimeter of the bearing retainer 50 so as to allow a larger surface area to engage the top surface of outer race 94 of the bearing assembly 91. Preferably, through holes 52 are shaped such that screws 53 may be counter-sunk. Accordingly, when screws 53 are inserted into the through holes 52 and threaded into bore holes 28 formed in caster horn 10, the top surface of the screw heads will be even with the top surface of bearing retainer 50 to ensure that they will not engage swivel cap 40. Thus secured, the outer race 94 of the bearing assembly 91 will rotate in unison with caster horn 10.

Figure 11:
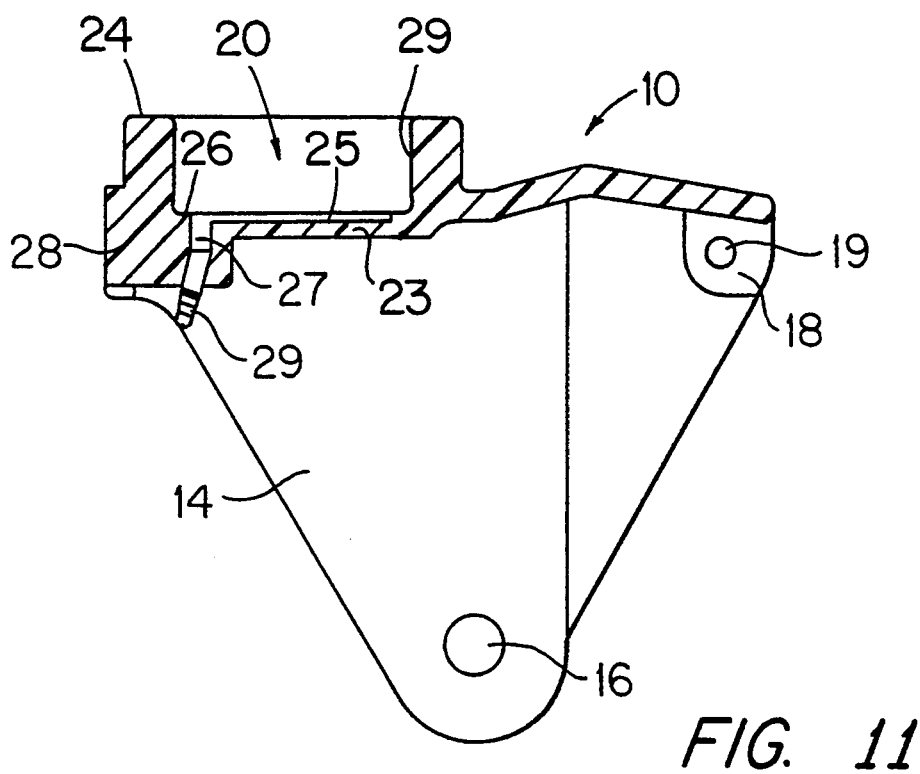
FIG. 11 is a cross-sectional view, similar to FIG. 2, of the caster horn shown in FIG. 1 showing an additional feature of the present invention.

FIG. 11 discloses another embodiment of caster horn 10. All reference characters identical to those discussed previously refer to substantially identical structures and need not be again discussed. According to this embodiment, a reinforced area 28 is formed at the end of caster horn 10 on which bearing cup 20 is disposed. The reinforced area 28 provides space to accommodate a passageway 27 in communication with the recessed area 25 formed in base portion 23 of bearing cup 20. A grease fitting 29 is threadably, or otherwise secured, in reinforced portion 28 and communicates with passageway 27. Grease fitting 29 allows lubrication of the bearing assembly 91 (not shown) as needed. The grease fitting 29 is of a conventional type, such as a spring-loaded ball type, which permits lubricants to be inserted under high pressure, but prohibits the flow of liquids therethrough under low pressure. Accordingly, bearing cup 20 is not compromised by the introduction of a foreign substance.

The above-disclosed caster may be manufactured by forming a caster horn having a web portion with a bearing cup and a pair of downwardly-extending, opposed leg portions, the web portion and the leg portions defining a U-shaped, unitary member providing a wheel-accommodating space therebetween; pressing one end of a stem into the bearing such that the stem will be vertically rotatable with respect to the caster horn; thermoplastically seating the bearing assembly in the bearing cup; mechanically securing the bearing assembly in the bearing cup by means of a retainer and a plurality of fasteners; covering the bearing cup with a swivel cap while allowing access to an end of the stem, and rotatably supporting a wheel within the wheel-accommodating space. If desired, a grease fitting may be threadedly secured in the caster horn to communicate with the inside of bearing cup.

Thus, what has been described is a relatively inexpensive, durable, simply fabricated and easily maintained caster which lends itself to a broad range of uses, particularly in the food service, lodging, and health care industries.

Of course, all specific shapes, dimensions, and materials mentioned herein are provided by way of example only. Casters comprising components fabricated in shapes and dimensions, and using different materials, other than those discussed and illustrated herein also are contemplated.

Although specific embodiments of the present invention have been described above in detail, it will be understood that this description is merely for purposes of explanation. Various modifications of equivalent structures corresponding to the disclosed aspects of the preferred embodiments in addition to those described above may be made by those skilled in the art without departing from the spirit of the present invention, which is defined in the following claims, the scope of which is to be accorded the broadest interpretation so as to encompass all such modifications and equivalent structures.

What is claimed is:

1. A caster, comprising:
   a unitary U-shaped caster horn having a web portion and a pair of downwardly-extending, opposed leg portions, and having a bearing cup formed on a top surface of said caster horn, said bearing cup being defined by an annular wall portion and a closed bottom portion, said wall portion and said bottom portion being continuous with each other;
   a bearing disposed in said bearing cup;
   a stem having one end fitted into said bearing and being rotatably supported by said bearing;
   a cap having a centrally-located hole formed on a top surface thereof and disposed in a snug-fitting relationship with said stem and being removably mounted on said bearing cup such that said stem extends through said hole, wherein said cap covers an opening of said bearing cup and substantially overlaps an exterior side wall surface of said annular wall portion to restrict ingress of foreign matter into said bearing cup; and
   a wheel rotatably supported between said leg portions such that said caster horn partially surrounds said wheel.

2. The caster according to claim 1, further comprising an annular bearing retainer disposed over a top surface of said bearing and being secured to said bearing cup.

3. The caster according to claim 2, wherein said bearing retainer comprises a plurality of evenly-spaced holes.

4. The caster according to claim 3, further comprising a plurality of screws equal in number to said holes, said screws being counter sunk into said bearing retainer and being threadably secured in like-spaced boreholes formed in said annular wall portion of said bearing cup.

5. The caster according to claim 2, further comprising an axle about which said wheel rotates, said axle extending between and being secured to said leg portions.

6. The caster according to claim 5, wherein said axle comprises a bolt and a threadably compatible nut.

7. The caster according to claim 5, further comprising a stem-retaining ring removably secured in a groove formed in said stem.

8. The caster according to claim 5, wherein said caster horn is integrally formed from a thermoplastic resin.

9. The caster according to claim 8, wherein said thermoplastic resin is selected from a group of materials consisting of NSC TM, ESBRIDE TM, and Amodel ®.

10. The caster according to claim 5, wherein said bearing is a ball bearing assembly.

11. The caster according to claim 1, wherein said cap comprises a side wall portion provided with an integrally formed interiorly disposed rib for engaging an outer surface of said annular wall portion.

12. The caster according to claim 1, further comprising a brake mechanism.

13. The caster according to claim 12, wherein said brake mechanism comprises a brake lever and a brake member.

14. The caster according to claim 13, further comprising a pin secured in said caster horn, wherein said brake lever and said brake mender are rotatably supported about said pin and cooperate such that operation of said brake lever causes said brake member to engage said wheel in order to inhibit or prevent rotation of said wheel.

15. The caster according to claim 14, wherein said brake lever is formed of a thermoplastic material.

16. The caster according to claim 15, wherein said thermoplastic material is nylon.

17. The caster according to claim 1, further comprising a thread guard disposed on either side of said wheel.

18. The caster according to claim 1, wherein said bearing is disposed in said bearing cup such that a top surface of said bearing is substantially flush with a top surface of said annular wall portion of said bearing cup.

19. A caster according to claim 1, wherein said bearing is disposed in said bearing cup such that a bottom surface of said bearing is seated on a perimeter of said bottom portion of said bearing cup, and a top surface of said bearing is substantially flush with a top surface of said annular wall portion of said bearing cup.

* * * * *

UNITED STATES PATENT AND TRADEMARK OFFICE
CERTIFICATE OF CORRECTION

PATENT NO. : 5,390,393

DATED : February 21, 1995

INVENTOR(S) : REPPERT ET AL.

Page 1 of 3

It is certified that error appears in the above-identified patent and that said Letters Patent is hereby corrected as shown below:

Title page
AT [56] REFERENCES CITED

Foreign Patent Documents,
"40144   6/1968   Finland" should read
--40114   6/1968   Finland--;

"7390 of 1893 United Kingdom" should read
--7390   01/1894   United Kingdom--.

AT [57] ABSTRACT

Line 9, "an" should read --a--.

COLUMN 1

Line 32, "tile" should read --the--.

COLUMN 2

Line 12, "(Draberr)," should read --Drabert),--.

UNITED STATES PATENT AND TRADEMARK OFFICE
CERTIFICATE OF CORRECTION

PATENT NO. : 5,390,393

DATED : February 21, 1995

INVENTOR(S) : REPPERT ET AL.

It is certified that error appears in the above-identified patent and that said Letters Patent is hereby corrected as shown below:

COLUMN 3

Line 5, "U-shaped," should read --U-shaped--.
  Line 24, "space," should read --space--.
  Line 41, "; therebetween" should read --therebetween;--.

COLUMN 4

Line 32, "boreholes 28" should read --boreholes 24'--.
  Line 40, "its" should read --their--.

COLUMN 5

Line 41, "V-shaped," should read --U-shaped--.

COLUMN 6

Line 3, "boreholes 28" should read --boreholes 24'--.
  Line 61, "Dolt 90." should read --bolt 90.--.

COLUMN 7

Line 11, "tile" should read --the--.

UNITED STATES PATENT AND TRADEMARK OFFICE
CERTIFICATE OF CORRECTION

PATENT NO. : 5,390,393

DATED : February 21, 1995

INVENTOR(S): REPPERT ET AL.

It is certified that error appears in the above-identified patent and that said Letters Patent is hereby corrected as shown below:

COLUMN 10

Line 46, "counter sunk" should read --countersunk--.

COLUMN 11

Line 11, "mender" should read --member--.

Signed and Sealed this

Fourth Day of June, 1996

Attest:

BRUCE LEHMAN

Attesting Officer

Commissioner of Patents and Trademarks